United States Patent
Fukui et al.

(10) Patent No.: US 6,246,779 B1
(45) Date of Patent: Jun. 12, 2001

(54) GAZE POSITION DETECTION APPARATUS AND METHOD

(75) Inventors: Kazuhiro Fukui; Osamu Yamaguchi, both of Hyogo-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/209,266

(22) Filed: Dec. 11, 1998

(30) Foreign Application Priority Data

Dec. 12, 1997 (JP) .............................................. P09-342615

(51) Int. Cl.[7] ...................................................... G06K 9/00
(52) U.S. Cl. ........................ 382/103; 382/118; 382/115; 382/100
(58) Field of Search ...................................... 382/103, 115, 382/118, 100; 351/221; 424/133.1; 600/558; 396/51

(56) References Cited

U.S. PATENT DOCUMENTS

| | | | |
|---|---|---|---|
| 5,485,399 | * 1/1996 | Saigo et al. | 364/525 |
| 5,689,619 | * 11/1997 | Smyth | 395/10 |
| 5,797,046 | * 8/1998 | Nagano et al. | 396/51 |
| 5,818,954 | * 10/1998 | Tomono et al. | 382/115 |
| 5,861,940 | * 1/1999 | Robinson et al. | 351/221 |
| 5,983,030 | * 11/1999 | Nagano | 396/51 |
| 6,095,989 | * 8/2000 | Hay et al. | 600/558 |

OTHER PUBLICATIONS

S. Baluja et al., "Non–Intrusive Gaze Tracking Using Artificial Neural Networks", School of Computer Science, Carnegie Mellon University, pp. 1–14, (1994).

R. Pappu et al., "A Qualitative Approach to Classifying Gaze Direction", Proceedings of 3rd International Conference Automatic Face and Gesture Recognition, pp. 160–165, (1998).

* cited by examiner

Primary Examiner—Matthew C. Bella
Assistant Examiner—M B Choobin
(74) Attorney, Agent, or Firm—Finnegan, Henderson, Farabow, Garrett & Dunner, L.L.P.

(57) ABSTRACT

A gaze position detection apparatus. A dictionary section previously stores a plurality of dictionary patterns representing a user's image including pupils. An image input section inputs an image including the user's pupils. A feature point extraction section extracts at least one feature point from a face area on the input image. A pattern extraction section geometrically transforms the input image according to a relative position of the feature point on the input image, and extracts a pattern including the user s pupils from the transformed image. A gaze position determination section compares the extracted pattern with the plurality of dictionary patterns, and determines the user's gaze position according to the dictionary pattern matched with the extracted pattern.

25 Claims, 8 Drawing Sheets

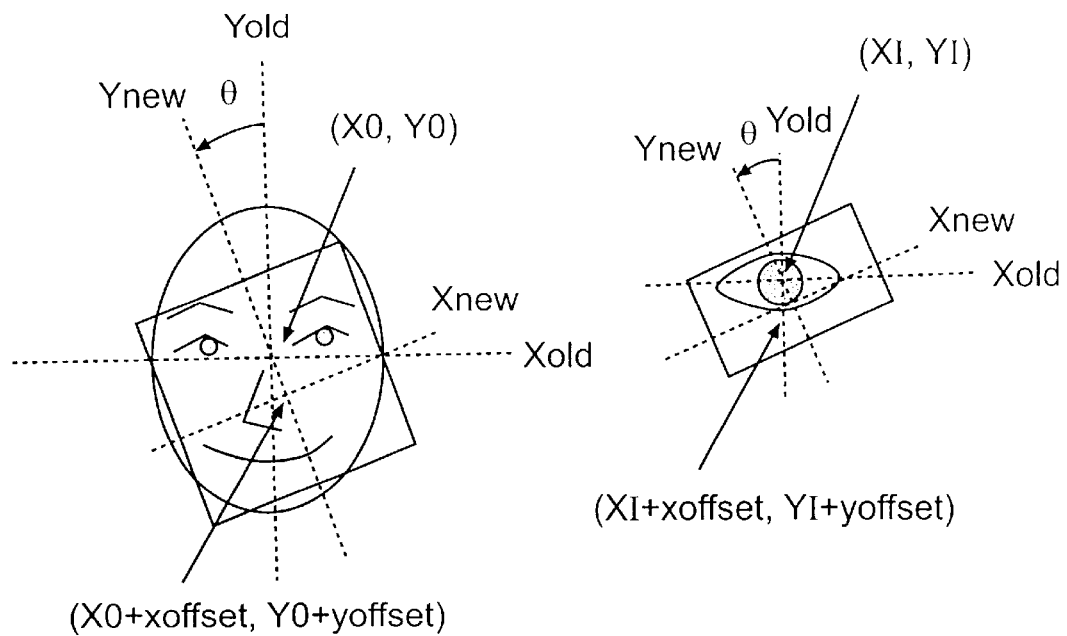
FIG. 7A  FIG. 7B
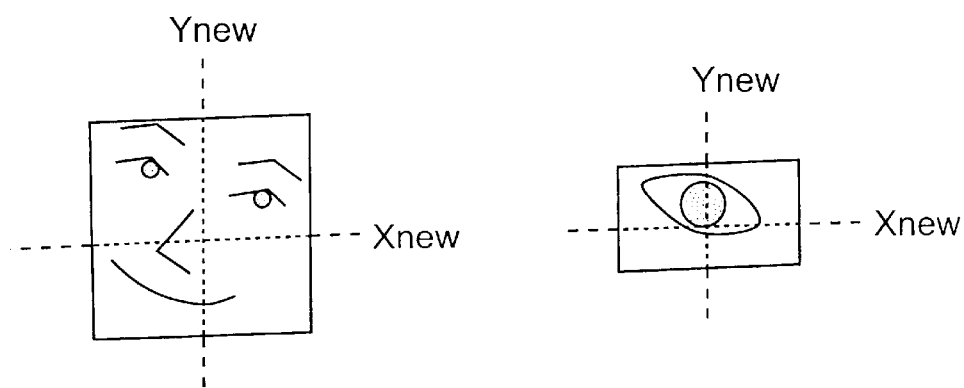
FIG. 8A  FIG. 8B

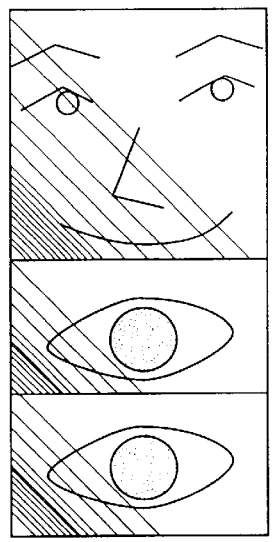
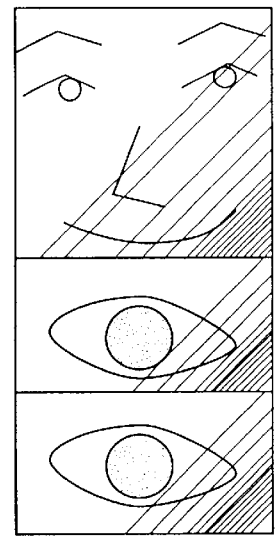
INDEX 1            INDEX 2
FIG. 9
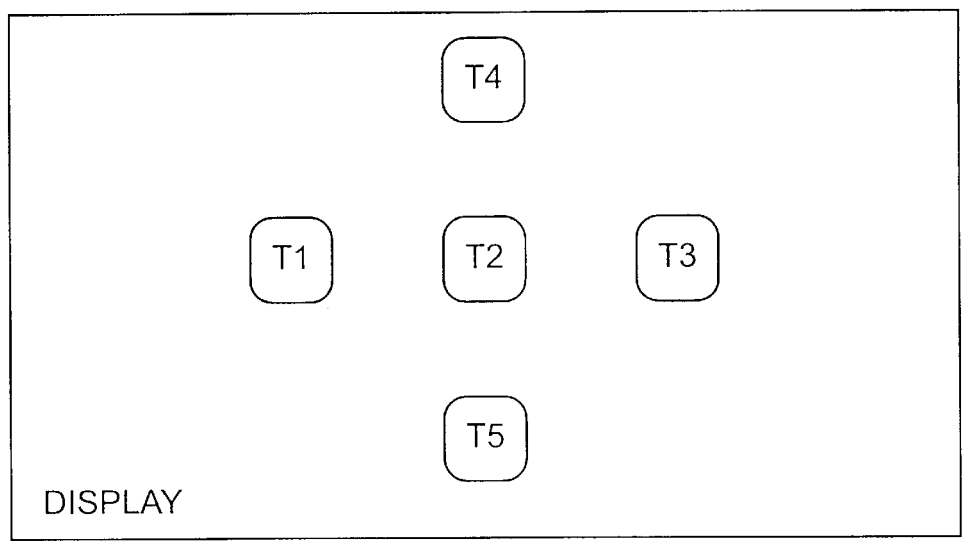
FIG. 10

GAZE POSITION DETECTION APPARATUS AND METHOD

BACKGROUND OF THE INVENTION

1. Field of the Invention

The present invention relates to a gaze position detection apparatus and method for correctly detecting a user's focus of attention as an input command signal to a computer system.

2. Description of the Related Art

An information of gaze or sight of attention region is widely used in various technical areas from human/machine interfaces to psychology. For example, gaze direction is now used as an input device instead of a mouse or a touch screen. If the focus change of a window or the movement of a cursor is executed by the user's focus of attention, mouse use is greatly reduced.

Furthermore, if a physical characteristic of a user who gazes at an interesting object is used, the user's interest is estimated in order to improve the human interface. For example, by combining gaze direction detection and speech recognition, stability of the speech recognition is improved. In the speech recognition of prior art, as a cause of error detection, start timing of speech recognition is not correctly detected in an actual environment including noise. In this case, the user's gaze at an icon (button) on a display triggers the start timing, and the speech recognition is stably executed. The user's physical status is also estimated by changes of the gaze direction. For example, by measuring changes of a driver's visual line as a function of time, sleeping or falling attention by fatigue is detected to prevent traffic accidents.

As a detection method of gaze position (focus of attention point) in the prior art, a first method using reflection of infrared rays and a second method using the image information are adopted. In the first method, the infrared ray is applied from a light emitting diode attached to a glass to the user's eyes and the rotation angle of the eyeballs is detected by reflection characteristics. A system based on this principle is already on the market. However, in this case, a special glass to restrict a motion of the user's body and a magnetic coil to detect a motion of the user's head is necessary to be attached and the user feels a great burden. Therefore, the detection of the gaze position in a natural state is difficult and this method is only used in limited areas such as medical treatment and psychology. As a result, the first method is not actually utilized in a human interface such as the computer.

In the second method, the image of the user's face or pupils from a TV camera is used. Especially, a center position on the pupil and three positions of marker on the glass are detected by image processing and the gaze position is calculated by a tigonometrical survey of the detected positions. In comparison with the first method, the user does not feel a great burden because the device to restrict the user's motion is not necessary. However, in the second method, several problems exist as application to the human interface, such as use of the infrared rays or the marker in the glass. In addition to this, two special cameras to control zoom, pan, and tilt are necessary. Therefore, system construction is largely complicated, and many and unspecified users can not easily use through the personal computer.

Another method using the image processing reduces the user's burden. A special device such as the glass is not necessary. In this method, transformation from a pupil pattern to gaze position on the display is learned by a neural networks.

[Shumeet, B., Dean Pomerleau "Non-Intrusive Gaze Tracking Using Artificial Neural Networks", Advance in Neural Information Processing Systems (NIPS) 6, 1994], [Shumeet, B., Dean Pomerleau "Non-Intrusive Gaze Tracking Using Artificial Neural Networks", CMU-CS-94-102, 1994. (http://www,cs.cmu.edu/afs/cs/user/baluja/www/techreps.html)]

In this method, a learning set as a pair of the pupil pattern to gaze an area on the display and a coordinate of the gaze position is prepared for all areas on the display. This learning set is updatedly learned by using back propagation to the neural networks. After the neural networks are learned, in response to the pupil pattern of the user, the coordinate (x, y) of the gaze position corresponding to the pupil pattern on the display is outputted. In this case, only one camera is necessary and special devices such as the glass are not necessary. The user's burden is greatly reduced, and this method is most suitable for the human interface. However, the following two problems still exist in this method.

(1) When a position of the user's head changes, precision of detection of the gaze position falls rapidly. For example, even if a first pupils' pattern at a first timing and a second pupils' pattern at a second timing are the same, the gaze position corresponding to the first pupils' pattern and the gaze position corresponding to the second pupils' pattern on the display are often different. In order to decide a difference between the first pupils' pattern and the second pupils' pattern, the coordinates of each gaze position is converted by position of the user's head. However, this method is not a perfect solution idea.

(2) A long time is required to learn the neural networks. The learning must be executed for all areas on the display in order to correctly detect the gaze position, even if the user gazes any area on the display.

SUMMARY OF THE INVENTION

It is an object of the present invention to provide a gaze position detection apparatus and method to correctly detect a user's focus of attention on the display even if the user gazes at any area on the display.

According to the present invention, there is provided a gaze position detection apparatus, comprising: dictionary means for storing a plurality of dictionary patterns representing a user's image including pupils; image input means for inputting an image including the user's pupils; feature point extraction means for extracting at least one feature point from a face area on the input image; pattern extraction means for geometrically transforming the input image according to a relative position of the feature point on the input image, and for extracting a pattern including the user's pupils from the transformed image; and gaze position determination means for comparing the extracted pattern with the plurality of dictionary patterns, and for determining the user's gaze position according to the dictionary pattern matched with the extracted pattern.

Further in accordance with the present invention, there is also provided a gaze position detection method, comprising the steps of: storing a plurality of dictionary patterns representing a user's image including pupils; inputting an image including the user's pupils, through an image input unit; extracting at least one feature point from a face area on the input image; geometrically transforming the input image according to a relative position of the feature point on the input image; extracting a pattern including the user's pupils from the transformed image; comparing the extracted pattern with the plurality of dictionary patterns; and determining the user's gaze position according to the dictionary pattern matched with the extracted pattern.

Further in accordance with the present invention, there is also provided a computer-readable memory, comprising: instruction means for causing a computer to store a plurality of dictionary patterns representing a user's image including pupils; instruction means for causing a computer to input an image including the user's pupils through an image input unit; instruction means for causing a computer to extract at least one feature point from a face area on the input image; instruction means for causing a computer to geometrically transform the input image according to a relative position of the feature point on the input image; instruction means for causing a computer to extract a pattern including the user's pupils from the transformed image; instruction means for causing a computer to compare the extracted pattern with the plurality of dictionary patterns; and instruction means for causing a computer to determine the user's gaze position according to the dictionary pattern matched with the extracted pattern.

BRIEF DESCRIPTION OF THE DRAWINGS

FIGS. 7A and 7B are schematic diagrams of the user's face area image and pupil area image each being rotated and parallel-moved in proportion to a relative position.

FIGS. 8A and 8B are schematic diagrams of the dictionary pattern generated from the rotated and parallel-moved image shown in FIGS. 7A and 7B.

FIG. 9 is a schematic diagram of the dictionary pattern according to a modification of the present invention.

FIG. 10 is a schematic diagram of five indexes on the display.

DETAILED DESCRIPTION OF THE PREFERRED EMBODIMENTS

Embodiments of the present invention are described below with reference to the drawings. First, a basic concept of the present invention is explained.

As for above-mentioned problem (1) in the prior art, coordinate information is added to the extracted pattern in the input image. Concretely speaking, as for the user's face area extracted from the input image, the coordinate value of a feature point of the face area on the input image, for example, (x, y) coordinate of a center point of the face area on the input image, is outputted. Based on a relative position of the coordinate value on the input image, the extracted pattern is affine-transformed, such as rotation or parallel-moving. Alternatively, the image intensity of pixels in the extracted pattern may be partially converted according to the relative position.

Figure 1A:
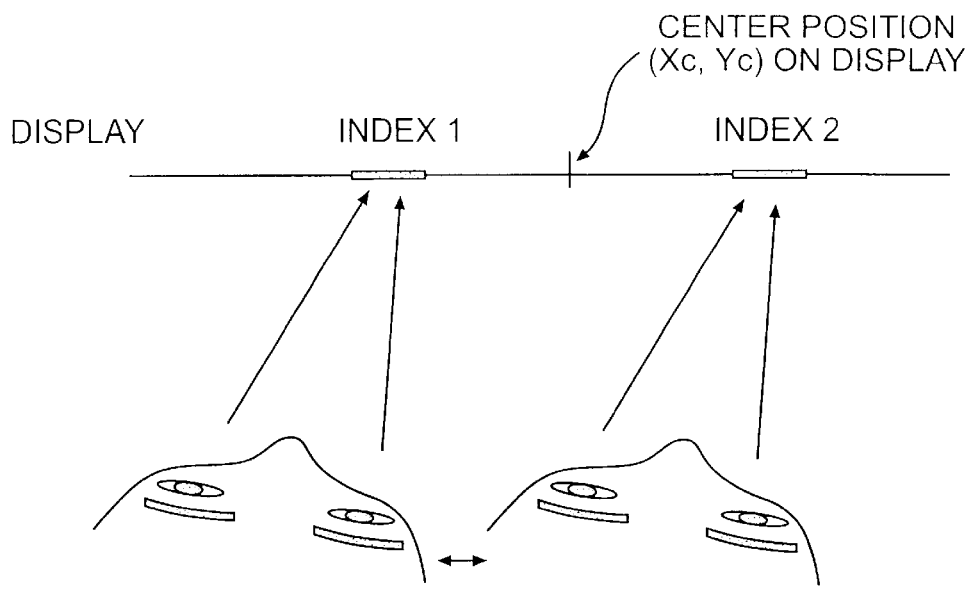
FIGS. 1A–1C are schematic diagrams showing a difference between the dictionary pattern of the prior art and the dictionary pattern of the present invention.
Figure 1B:
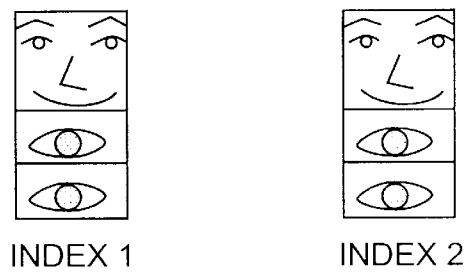
Figure 1C:
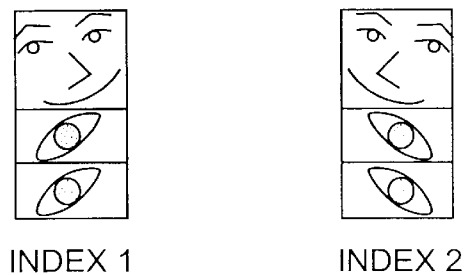

For example, as shown in FIG. 1A, assume that the user gazes at an index 1 on the display at a first head position and the user gazes at an index 2 on the display at a second head position. FIG. 1B shows the extracted pattern of the user's face area and pupils' area from the input images for the index 1 and the index 2 in the prior art. The extracted pattern for the index 1 and the extracted pattern for the index 2 are the same inspite of two different indexes at which the user gazes. However, in the present invention, the extracted pattern is intentionally transformed (rotated) according to the relative position of the face area in the input image. Therefore, as shown in FIG. 1C, the extracted pattern for the index 1 and the extracted pattern for the index 2 are different to discriminate from each other.

Figure 2A:
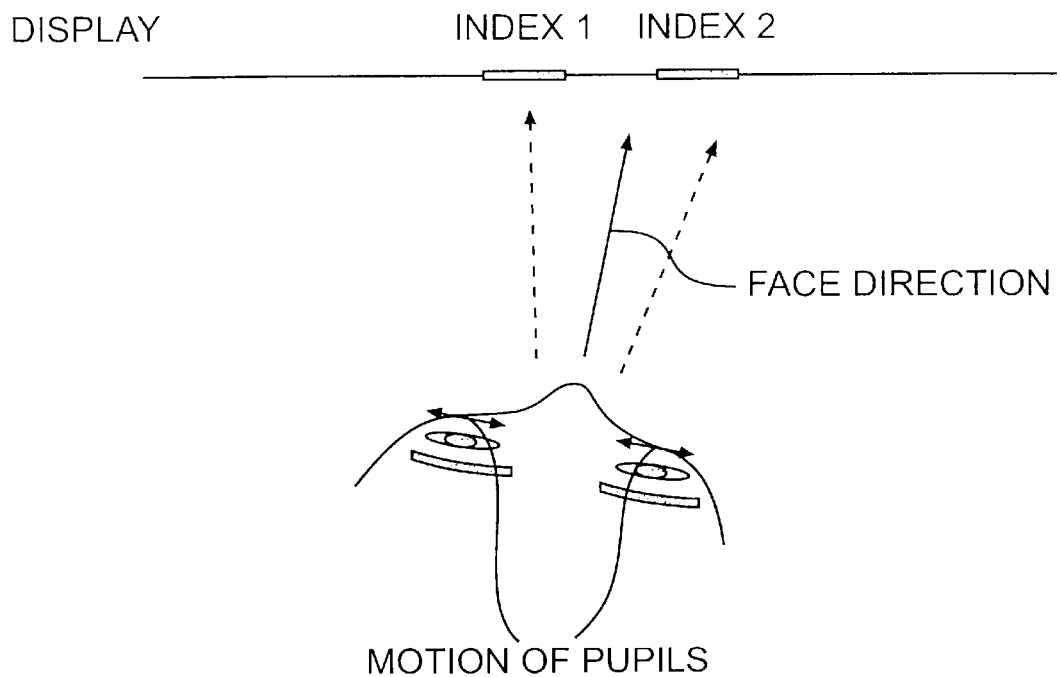
FIGS. 2A and 2B are schematic diagrams showing the dictionary pattern of the present invention when the user gazes at the index on the display along a fixed face direction.
Figure 2B:
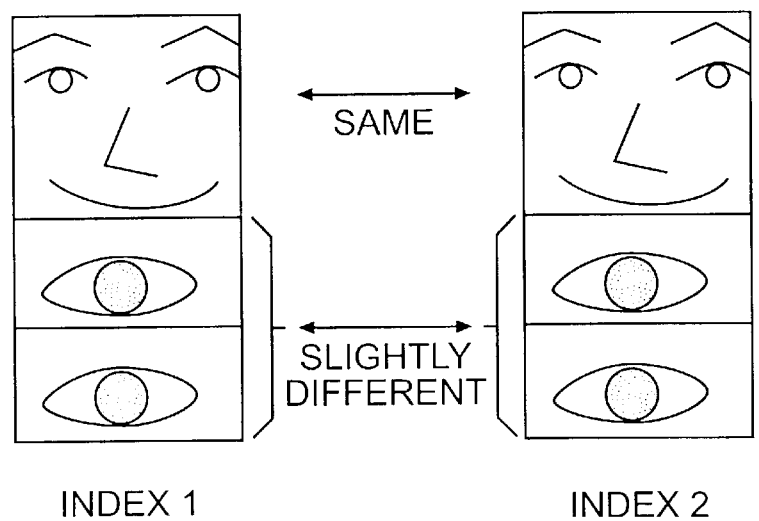

However, if the distance between the index 1 and the index 2 on the display is short, the same image patterns of the user's face area and pupils' area are often generated. For example, as shown in FIG. 2A, assume that the user gazes at the index 1 and the index 2 by a simple movement of the eyes while the head position is fixed. In this case, in the prior art, almost same patterns of the user's pupils are extracted from the input image for the index 1 and the input image for the index 2 because the position of the eyes does not almost change between the index 1 and the index 2 as shown in FIG. 2B. These extracted patterns for the index 1 and the index 2 are not correctly discriminated each other. In this case, a lens of a TV camera whose focal distance is long so that the face area is widely inputted in all over the image is effective.

As for the above-mentioned problem (2) in the prior art, the dictionary pattern for a specified area to use frequently, for example, an index such as an icon or a menu on the display, is only registered. In case of use on a computer display, the gaze positions for all areas on the display are not necessarily extracted. Even if the gaze position for only the specified area such as the icon, the menu or a window, is detected, the use value is sufficient. In this case, the registration time for the dictionary pattern for several specified areas is greatly reduced in comparison with the learning of the neural networks for all areas on the display in the prior art.

Figure 3:
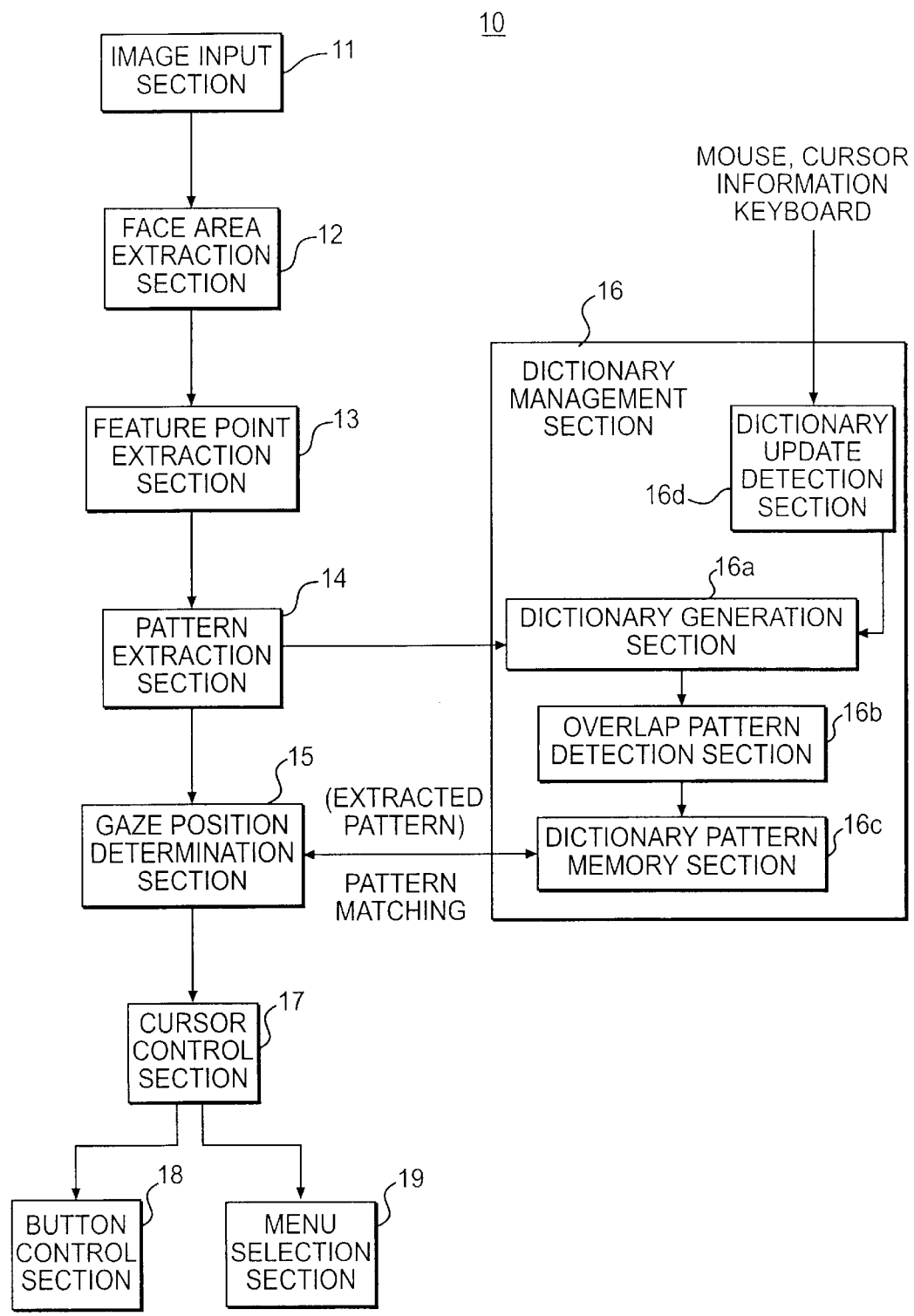
FIG. 3 is a block diagram of the gaze position detection apparatus according to the present invention.

Next, a first embodiment of the present invention is explained by referring to FIGS. 3–8. FIG. 3 is a block diagram of the gaze position detection apparatus according to the first embodiment. In the first embodiment, the gaze position detection apparatus 10 detects the user's gaze position to select the index (menu, button) on the display instead of the mouse. As shown in FIG. 3, the gaze position detection apparatus 10 comprises an image input section 11, a face area extraction section 12, a feature point extraction section 13, a pattern extraction section 14, a gaze position determination section 15, a dictionary management section 16, a cursor control section 17, a button control section 18, and a menu selection section 19. The gaze position detection apparatus 10 is preferably realized by a personal computer. The image input section 11 is preferably a TV camera connected to the personal computer. Each function of the face area extraction section 12, the feature point extraction section 13, the pattern extraction section 14, the gaze position determination section 15, the dictionary management section 16, the cursor control section 17, the button control section 18, and the menu selection section 19 are then executed by a program stored in a memory media such as FD, CD-ROM, solid-state memory, Hard Disk, and so on.

Figure 4:
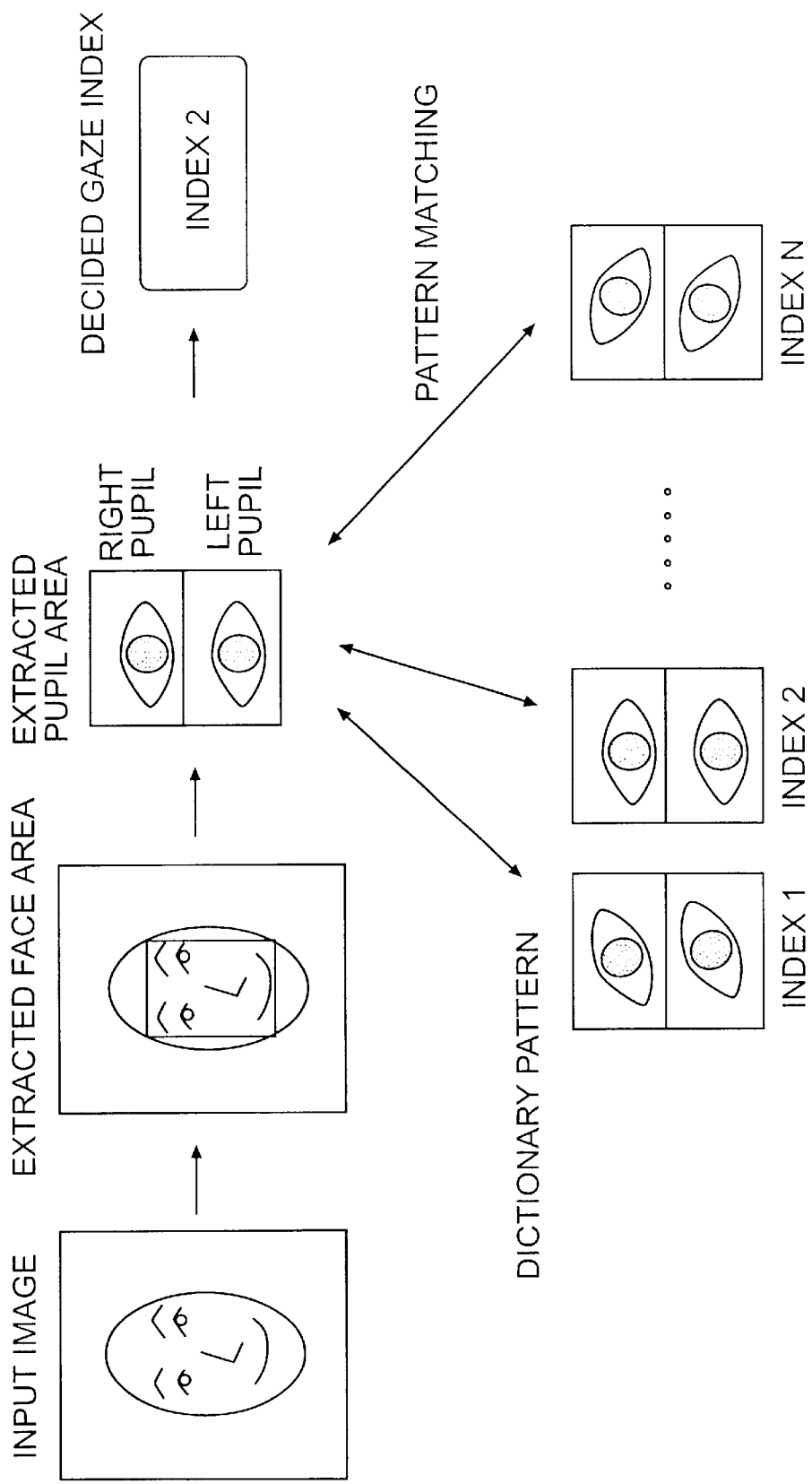
FIG. 4 is a schematic diagram of a processing flow of the present invention.

FIG. 4 is a schematic diagram of a generic processing flow of the first embodiment. First, in the first embodiment, in dictionary registration mode, an image pattern of the user's pupils' area when the user gazes at the index on the display is previously registered as the dictionary pattern corresponding to the index. An image pattern of the user's face area may be registered in addition to the pupils' area. As for all indexes as the user's gaze object on the display, the image pattern when the user gazes at each index is previously registered as the dictionary pattern corresponding to the each index. Then, in application mode, in order to determine the gaze position on the display, extracted pattern from new input image is compared with each dictionary pattern. One dictionary pattern whose similarity is highest and above a threshold is selected and the index corresponding to the one dictionary pattern is determined as the user's gaze position. In FIG. 4, the pupils' pattern is registered as the dictionary pattern (INDEX 1~INDEX N). However, in following explanation, the pupils' pattern and the face pattern are used as the dictionary pattern.

The image input section 11 such as TV camera inputs the image including the user's face area (pupils area). The input image is digitized by an A/D converter and supplied to the face area extraction section 12. For example, a TV camera is located at the lower part of a monitor of an information terminal apparatus. Alternatively, the TV camera may be located at the upper part or corner of the monitor.

The face area extraction section 12 continually detects rough face area from the input image. As an extraction of the face area, subspace method or multiple similarity degree is applied. As the dictionary, the kinds of face dictionary and non-face dictionary (225 dimension 15×15 pixels) are prepared. The non-face dictionary is generated from a pattern set of a non-face area similar to the face area, which is apt to be erroneously detected. While a face area template and a non-face area template are moved all over the image, a similarity between the face dictionary and the image, and a similarity between the non-face dictionary and the image are calculated in order. A plurality of local maximum points of the value calculated by subtracting the latter similarity from the former similarity is detected in the image. An area with a local maximum point larger than a threshold in the image is extracted as the face area. This processing is executed in order by each size template. For example, the size of the face area template and the size of the non-face area template are respectively changed as large, middle, and small. Then each size template is moved on the image as mentioned-above. In order to process at high speed, a difference area between two images continued timely is detected and the difference area larger than a threshold is regarded as the search area.

The feature point extraction section 13 extracts positions of the pupils and the nostrils from the extracted face area by facial feature point extraction method. This method is disclosed in detail in U.S. patent application Ser. No. "08/815, 135". In this case, simultaneous extraction of four feature points of the pupils and the nostrils is explained. However, each feature point is able to be extracted individually.

First, by using a separability filter, candidate of feature point area such as the pupil and the nostril similar to circle shape is extracted from the face area. In gaze position detection mode, a search area for the separability filter is limited to an area whose image intensity is below neighboring to the eye or the nostril. This filter outputs probability value of the feature area in a circle shape by normalized value. For example, if the separability filter is applied to the face area image, the highest value is outputted from a center point of the pupil area or the nostril area. This filter function is based on a separability value of statistic information between neighboring areas and a circle feature point is correctly extracted without influence of change of the image intensity.

Figure 5B:
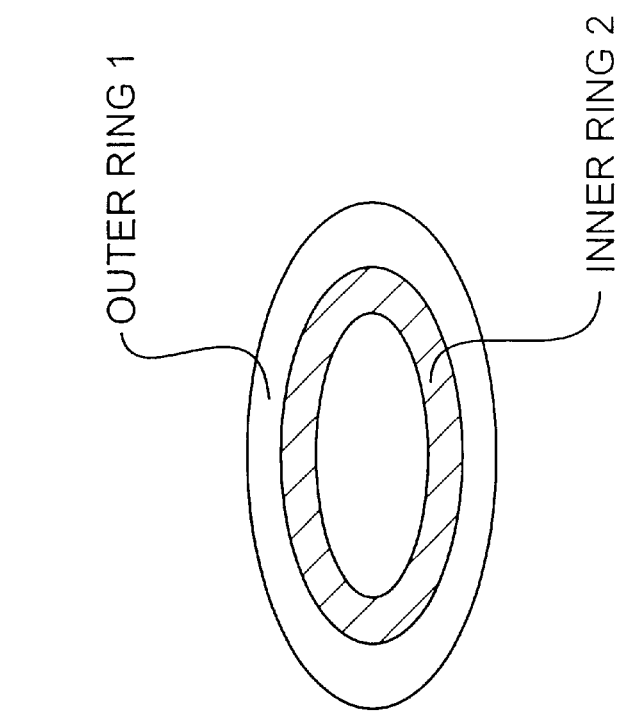
FIGS. 5A and 5B are schematic diagrams of a separability value mask.
Figure 5A:
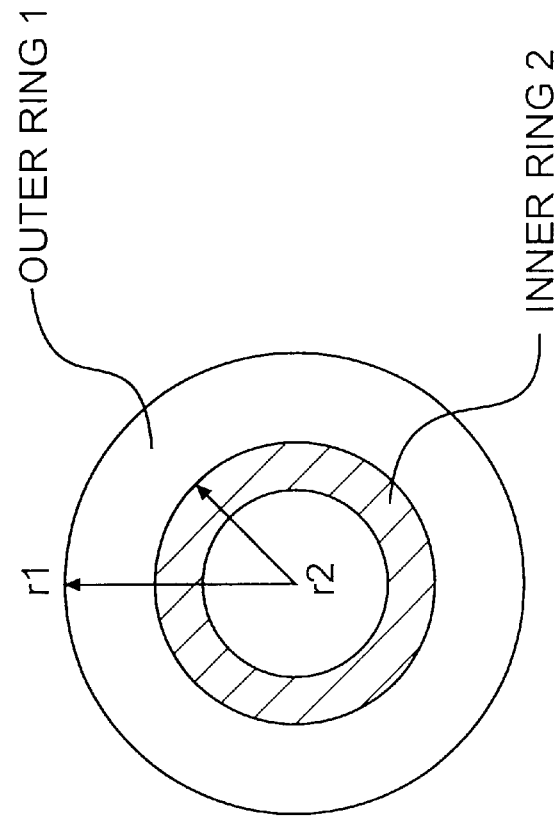

As shown in FIG. 5A, the separability filter consists of an outer ring 1 and an inner ring 2. The separability value indicates the degree of separability of region information (For example, the image intensity) characterizing the outer ring 1 and the inner ring 2. As for the circular feature point such as a pupil or the nostril, the separability filter outputs "1.0". While the separability filer is shifted from the circular shape area, the output value decreases. The output value (separability value η) of the separability filter is preferably calculated as in the following equation.

$$\eta = \frac{\sigma b^2}{\sigma T^2}$$

$$\sigma_b^2 = (n_1(P_1 - P_m))^2 + (n_2(P_2 - P_m))^2$$

$$\sigma_T^2 = \sum_{i=0}^{N-1} (P_i - P_m)^2$$

N: number of all pixels in the outer ring 1 and the inner ring 2
$n_1$: number of pixels in the outer ring 1
$n_2$: number of pixels in the inner ring 2
$\sigma_T$: all distribution values in the outer ring 1 and the inner ring 2
$P_i$: density value of pixel i
$P_1$: average density value of pixels in the outer ring 1
$P_2$: average density value of pixels in the inner ring 2
$P_m$: average density value of pixels in the outer ring 1 and the inner ring 2
$0 < \eta \leq 1.0$ The separability value for a perfectly flat area is not defined because distribution of denominator is "0". Actually, if all distribution values $\sigma_T$ are below a basis threshold $\sigma_L$, the separability value is set as "0". As shown in FIG. 5B, model shape of the separability filter changes from the circle to an ellipse, a lip area and an eye area (black area and white area) are extracted. By changing the diameter of the filter mask such as "3~7", the maximum value is regarded as the output value of the pixel. In this case, if trimming of sample pixel $P_i$ is executed, robust ability rises up. For example, image intensity of sample pixel $P_i$ in each area is arranged in order of higher value, and the image intensities of "5%" from the highest value and the lowest value in all image intensities are deleted. As for the remaining image intensities, the distribution value and the average value are calculated and a new separability value is also calculated by the distribution value and the average value. In this way, a partial disappeared area in the pupil is stably extracted.

The local maximum point among outputted separability values is a center point of the feature point candidate. A radius of the separability filter which outputted the local maximum point is a radius of the feature point candidate. As the feature point candidate, the corner of the eyes and the edge of the eyebrow are erroneously extracted. Therefore, these candidates are verified as correct feature point by pattern matching. In the verification, a feature point set consisting of four feature points (both pupils and both nostrils) is selected from the feature point candidates. A combination of the four feature points is restricted by constraint of location of facial feature points. As for each feature point candidate, the neighboring pattern is extracted based on the center point and the radius. This extracted pattern is matched with a standard pattern in order to calculate the similarity. The standard pattern is previously extracted based on the center point and the radius of correct feature point. The feature point set whose sum of similarity value is highest is determined as a correct combination of four feature points. In this case, "a negative dictionary" is generated from the pattern consisting of the corner of the eyes and the edge of the eyebrows. A final similarity value is calculated by subtracting "negative similarity value" from positive similarity value.

Figure 6:
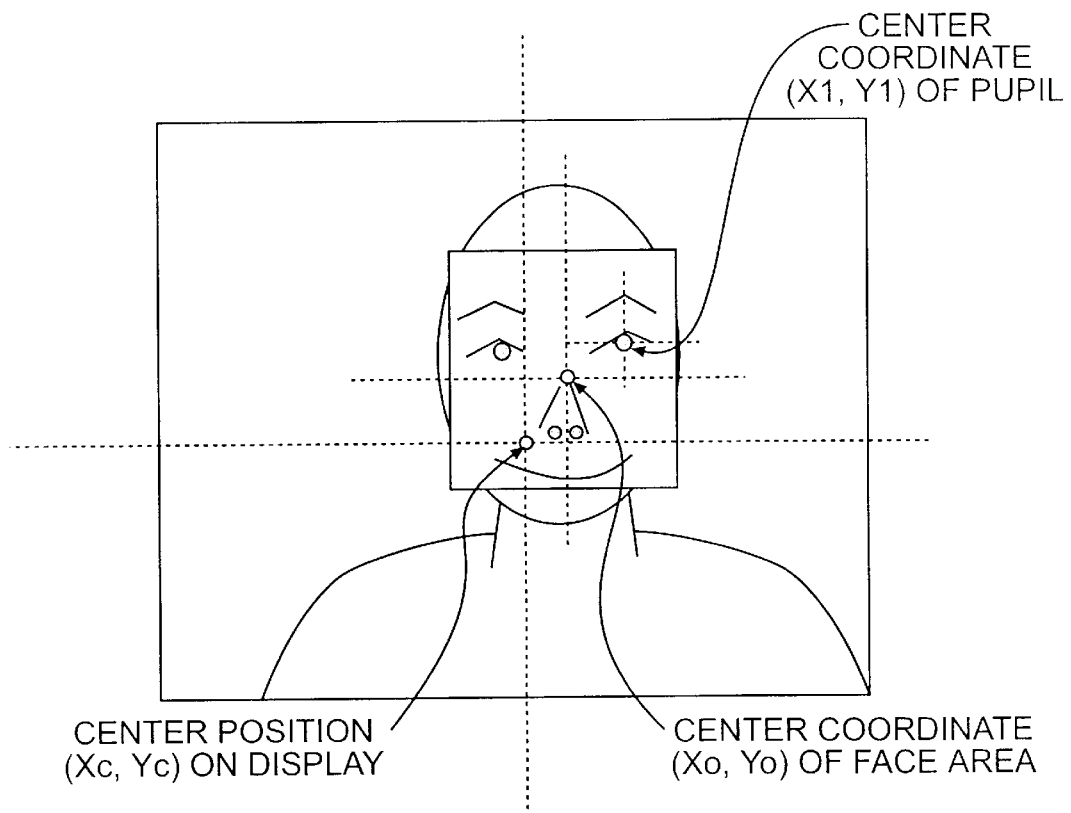
FIG. 6 is a schematic diagram of the user's face area in the input image.

The pattern extraction section 14 extracts the pupil area and the face area transformed based on the relative position of the feature point in the image. For example, as the center point of four feature points of both pupils and both nostrils and a distance between both pupils, the face area is extracted in a size of 15×15 pixels. As for the pupil area, the neighboring pattern is extracted based on the center point and the radius of the pupil in same way of the feature point candidate. A motion of all face is not reflected to the pupil area pattern only. Therefore, the face area pattern is used in addition to the pupil area pattern. For example, as shown in FIGS. 1C and 2B, an upper square (16 pixels×15 pixels) represents the face pattern and two lower rectangles (8 pixels×15 pixels) represents the pupil pattern. In this case, before extracting the face area and the pupil area from the image, a coordinate value of the face area and the pupil area on the image are detected. The face area and the pupil area are respectibely transformed based on each coordinate value. As transformation to the pattern (the face area and the pupil area), Affine-transformation is applied. As one example, as shown in FIG. 6, rotation and parallel-moving as the Affine-transformation is explained.

First, a center coordinate of the face area and the pupil area, as a rotation pivot point, is detected. A center coordinate (XO, YO) of the face area is an average coordinate among coordinates of two pupils and coordinates of two nostrils. A center coordinate (XI, YI) of the pupil area is a center position of the pupil. The coordinate (Xc, Yc) is the center position on the display. The difference between (Xc, Yc) and (XO, YO) indicates the position of the user's face relative to the screen. As shown in FIG. 7A, the face area is rotated about the center coordinate (XO, YO) by an angle "θ" corresponding to "XO or YO". As shown in FIG. 7B, the pupil area is rotated along the center coordinate (XI, YI) as "θ" corresponding to "XI or YI" (In this case, "X0, Y0" are replaced by "XI, YI" in following equations.).

$$\theta = (x_o - xc)/xc*180, \text{ or } \theta = (yo - yc)/yc*180$$

x offset=W1*(xo−xc)

yoffset=W2*(yo−yc)

$x_{new} = (x_{old} - xo)*\cos(\theta) - (y_{old} - yo)*\sin(\theta) + xo + xoffset$ $y_{new} = (x_{old} - xo)*\sin(\theta) - (y_{old} - yo)*\cos(\theta) + yo + yoffset$ $x_{new}, y_{new}$: X-coordinate and Y-coordinate after transformation $x_{old}, y_{old}$: X-coordinate and Y-coordinate before transformation xc, yc: center coordinate on the image w1, w2: weight coefficent θ: angle corresponding to X-coordinate xoffset: distance of parallel moving corresponding to X-coordinate yoffset: distance of parallel moving corresponding to Y-coordinate As shown in FIG. 8A, the transformed face area is represented as a rotated and parallel-moved pattern in proportion to a relative position of the face area on the image. As shown in FIG. 8B, the transformed pupil area is represented as a rotated and parallel-moved pattern in proportion to a relative position of the pupil area on the image. In both the dictionary registration mode and the gaze position detection mode (user's operation mode), the face area and the pupil area are transformed as mentioned-above. Therefore, even if the user gazes at the index on the display under a situation shown in FIG. 1A or FIG. 2A, the user's gaze position is correctly detected by matching the input pattern (the face area and the pupils area) with the dictionary pattern.

The above-mentioned geometrical transformation may be applied to a fish-eye lens. In this case, as for the input image transformed by following equation, the face area and the pupil area are extracted.

$$len = \sqrt{((x_{old} - x_c)^2 + (y_{old} - y_c)^2)}$$

$$\theta = \arctan\left(\frac{y_{old} - y_c}{x_{old} - x_c}\right)$$

$x_{new} = F(len)*\cos(\theta) + xc$ $y_{new} = F(len)*\sin(\theta) + yc$ $F(x) = A*x^2 + B*x + c$ A, B, C: arbitrary real number F: arbitrary function In the above-transformation, after the pattern is extracted from the transformed pattern, the extracted pattern is leveled by a histogram.

Instead of Affine-transformation as mentioned-above, the image intensities of pixels in the face area and the pupil area may be partially converted. As shown in FIG. 9, the image intensities of pixels of specified corner area in the face area and the pupil area are converted. The specified corner area corresponds to a relative position of the face area and the pupil area on the image. In this method, the user's gaze position is correctly detected in case of situation shown in FIGS. 1A and 1B.

The gaze position determination section 15 determines the index at which the user gazes on the display and outputs a coordinate of the index on the display. In this case, the pattern extracted from the pattern extraction section 14 is compared with the dictionary pattern of each index previously registered, and the similarity value between the extracted pattern and each dictionary pattern is calculated by pattern matching method such as subspace method. This similarity value is regarded as a gaze degree. Among the gaze degrees of all indexes, one index whose gaze degree is highest and larger than a threshold is selected as the user's gaze index.

In this case, the subspace method is simply explained. In case the image data is regarded as a vector of n×n dimension, subspace of category in feature space of n×n dimension is represented as subspace consisting of a plurality of eigenvectors. A projection angle "θ" of an input vector (pattern) projected to a subspace of one category represents the similarity degree between the input vector and the subspace. In order to determine the gaze index, the angle "θ" between the input vector and each category (each subspace) is calculated, and the input vector is classified to the category whose angle "θ" is highest among all calculated angles.

Projection element "cos θ" is represented as follows.

$$\cos^2\theta = \frac{\sum_{i=1}^{L}(inputvect,\ eigenvecti)^2}{|inputvect|^2}$$

The pupil moves even if the user fixedly gazes at the same place, and a position of the pupil vibrates slightly. A detection of gaze position using the pattern inputted one time is sometimes erroneous. Therefore, an average pattern calculated from a plurality of patterns inputted continuously is used as the input pattern, in order to rise the stability of the detection of the gaze position.

A mutual subspace method is an extension idea of the subspace method. In the mutual subspace method, an angle between two subspaces is defined as the similarity degree. In comparison with simple subspace method, change of shape of the pupil and change of facial expression do not affect on the similarity degree. Assume that a dictionary subspace is P and a subspace of a plurality of input dynamic images is Q. The similarity degree between the subspaces P and Q is then represented as follows.

λc=xc x=(xij)

$$x_{ij} = \sum_{m=1}^{M}(\phi_i,\ \phi_m)(\phi_m,\ \phi_j)$$

φ: base vector in subspace P
φ: base vector in subspace Q

In the above equation, the maximum eigenvalue of X is regarded as the similarity degree. As for the dynamic images, the subspace must be quickly generated from a series of input images. Therefore, a simultaneous iteration method for iteratively calculating a necessary eigenvector is applied. The simultaneous iteration method is disclosed in "Rutishauser, H. (1969) Computational aspects of F. L. Bauer's simultaneous iteration method. Num. Math. 13, 4–13". In this method, the eigenvector is updated whenever an image is inputted.

As shown in FIG. 3, the dictionary management section 16 comprises a dictionary generation section 16a, an overlap pattern detection section 16b, a dictionary pattern memory section 16c, and a dictionary update detection section 16d. The dictionary generation section 16a collects the pupil patterns when the user gazes at each index on the display from various directions or positions as the learning pattern. In case of collection, failure pattern such as a closed eye pattern is deleted. As for collected learning patterns, a new learning pattern is generated from the geometrical relation between coordinates of the index on the display and the focal distance of the lens in order to increase the number of learning samples. The eigenvector is calculated by analyzing a principal component for the learning pattern set. Several eigenvectors (for example, 10 units of eigenvectors) are selected in order from the highest value and the dictionary subspace is defined by selected eigenvectors.

The overlap pattern detection section 16b detects an overlap pattern from the learning pattern. In case a difference between neighboring two indexes on the display is short, change quantity of the pupil or a coordinate of the user's head is a little when the user gazes two indexes on the display. Therefore, common subspace between two subspaces corresponding to the two indexes exists. This common subspace is deleted as follows. First, each subspace $L_k$ is calculated from the sample image (the face area and the pupil area) corresponding to each index. The calculation of the common subspace is disclosed in [Therrien, C. W., "Eigenvalue properties of projection operators and their application to the subspace method of feature extraction", IEEE Trans. Compute, C-24,p.944–948,1975]. In this case, following $L_I$ is calculated as the common subspace.

$$L_I = \bigcap_{k=1}^{N} L_k$$

$L_k$(k=1, . . . , N)=subspace of N

First, projection matrix $P_k$ corresponding to each subspace is calculated.

$$P_k = \sum_{i=1}^{P} u_i u_i^T$$

$u_i$: eigenvector of subspace Lk
P: the number of eigenvector

Next, a matrix P* as weighted sum of each projection matrix $P_k$ is calculated.

$$P^* = \sum_{k=1}^{N} \alpha_k P_k$$

N: the number of subspace
$\alpha_k$: real number defined by following equation $$P^* = \sum_{k=1}^{N} \alpha_k = 1.0$$

0.0<αk<1.0

The eigenvalue of the projection matrix P* is distributed in "0~1.0". The eigenvector corresponding to "0" is represented as an orthogonal space to the common subspace. The eigenvector corresponding to "1.0" is represented as the common subspace itself. An eigenvalue of the other eigenvectors is gradually larger in proportion to angle between corresponding subspace and the common subspace. Actually, perfect common subspace does not exist, and a quasi-common subspace $L^*_I$ similar to the common subspace $L_I$ is extracted. The eigenvector whose eigenvalue is larger than a threshold is the eigenvector to form the quasi-common subspace $L^*_I$. In this case, the quasi-common subspace between all combinations of neighboring indexes is calculated. For example, as shown in FIG. 10, in case five indexes T1~T5 on the display are objects to be gazed by the user, following four combinations are calculated as the common subspace.

T1 ∩ T4 ∩ T2 ∩ T5

T4 ∩ T1 ∩ T2 ∩ T3

T3 ∩ T4 ∩ T2 ∩ T5

T5 ∩ T1 ∩ T2 ∩ T3

After the common subspace is calculated, the common subspace is deleted from the learning space corresponding to each index. As for the learning data from which the common subspace is deleted, analysis of principal component is executed and the dictionary pattern corresponding to each index is generated. In this way, the dictionary pattern corresponding to each index is stored in the dictionary pattern generation section 16c.

The dictionary update detection section 16d detects a timing to update the dictionary pattern memory section 16c while the user is operating this system. A detection of update timing is executed by combination of a gaze direction information, moving of a mouse, position of a cursor, and speech information. For example, if the index is moved by mouse operation, completion timing of moving of the mouse is regarded as the update timing. This update timing signal is outputted to the dictionary generation section 16a. The dictionary generation section 16a immediately collects the learning pattern for corresponding index and updates the dictionary pattern. The dictionary pattern is dynamically generated, updated, or deleted. Therefore, the latest dictionary is always prepared, and a change of illumination or physical change such as the user's fatigue does not affect to the dictionary.

In FIG. 3, an output signal from the gaze position determination section 15 is used to control various kinds of equipment such as home electric devices and information processing devices. The cursor control section 17 moves the cursor on the display in response to the output signal from the gaze position determination section 15. The button control section 18 selects a predetermined index in response to a cursor signal from cursor control section 17. For example, the predetermined index and corresponding command (For example, "LOG-OUT") are previously registered. In this case, the predetermined index is displayed at the user's disired position on the screen. In normal status, this predetermined index is not displayed on the screen. When the user gazes at a position of the predetermined index on the screen, a function of the corresponding command is automatically executed. The menu selection section 19 selects a menu in response to the cursor signal from the cursor control section 17. In this case, the menu is, for example, a window, an icon, or a file fixedly displayed on the screen. When the user gazes at his desired menu on the screen, a task corresponding to his gazed menu is automatically executed.

A memory device, including a CD-ROM, floppy disk, hard disk, magnetic tape, or semiconductor memory can be used to store instructions for causing a processor or computer to perform the process described above.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A gaze position detection apparatus, comprising: dictionary means for storing a plurality of dictionary patterns representing a user's face image including pupils, each dictionary pattern corresponding to each of a plurality of indexes on a display, an image for each dictionary pattern being input at a predetermined camera position while the user is gazing at each index on the display, the image being geometrically transformed as the dictionary pattern according to a relative position of a feature point of the user's face area on the image;

image input means for inputting an image including the user's pupils at the predetermined camera position in the user's operation mode;

feature point extraction means for extracting at least one feature point from a face area on the input image;

pattern extraction means for geometrically transforming the input image according to a relative position of the feature point on the input image, and for extracting a pattern including the user's pupils from the transformed image; and gaze position determination means for comparing the extracted pattern with each of the plurality of dictionary patterns, and for determining the users gaze position as one index on the display according to the dictionary pattern matched with the extracted pattern.

2. The gaze position detection apparatus according to claim 1, wherein the image for the dictionary pattern is previously inputted by said image input means fixedly located while the user is gazing at each index on the display.

3. The gaze position detection apparatus according to claim 2, further comprising a dictionary management means for extracting a basis coordinate of the user's face area as the feature point, calculating the relative position of the basis coordinate of the user's face area on the image for the dictionary pattern, geometrically transforming the image according to the relative position, and extracting the face area and at least one of the right and left pupils from the transformed image as one of the dictionary patterns.

4. The gaze position detection apparatus according to claim 3, wherein said dictionary management means manages correspondence between each of the plurality of dictionary patterns and each of a plurality of indexes on the display.

5. The gaze position detection apparatus according to claim 1, wherein said feature point extraction means is for extracting a basis coordinate of the face area as the feature point, and wherein the basis coordinate is a point calculated from at least one of the right and left pupils and the two nostrils on the face area.

6. The gaze position detection apparatus according to claim 5, wherein said pattern extraction means calculates the relative position between the basis coordinate of the face area and a center position on the input image, and executes Affine-transformation to the input image as a quantity corresponding to the relative position.

7. The gaze position detection apparatus according to claim 6, wherein said pattern extraction means rotates the input image about an angle corresponding to the relative position, and parallelly moves the basis coordinate on the rotated image a distance corresponding to the relative position.

8. The gaze position detection apparatus according to claim 7, wherein said pattern extraction means extracts the user's face area and right and left pupil areas from the rotated and parallel-moved image as the extracted pattern to compare with the plurality of dictionary patterns.

9. The gaze position detection apparatus according to claim 1, wherein said pattern extraction means partially converts image intensities of pixels included in the input image according to the relative position.

10. The gaze position detection apparatus according to claim 4, further comprising a cursor control means for positioning a cursor at the index corresponding to the dictionary pattern matched with the extracted pattern as the user's gaze position.

11. The gaze position detection apparatus according to claim 1, an input position of the image of said image input means is the same as an input position of the plurality of the dictionary patterns of said image input means.

12. The gaze position detection apparatus according to claim 5, wherein the basis coordinate is a center point between the right and left pupils and the two nostrils on the face area or a center point between the right and left pupils.

13. A gaze position detected method, comprising the steps of:
   storing a plurality of dictionary patterns representing a user's face image including pupils, each dictionary pattern corresponding to each of a plurality of indexes on a display, an image for each dictionary pattern being previously input at a predetermined camera position while the user is gazing at each index on the display, the image being geometrically transformed as the dictionary pattern according to a relative position of a feature point of the user's face area on the image;
   inputting an image including the user's pupils through an image input unit at the predetermined camera position in the user's operation mode;
   extracting at least one feature point from a face area on the input image;
   geometrically transforming the input image according to a relative position of the feature point on the input image;
   extracting a pattern including the user's pupils from the transformed image;
   comparing the extracted pattern with each of the plurality of dictionary patterns; and
   determining the user's gaze position as one index on the display according to the dictionary pattern matched with the extracted pattern.

14. The gaze position detection method according to claim 13, further comprising the step of:
   previously inputting the image for the dictionary pattern through the image input unit fixedly located while the user is gazing at each index on the display.

15. The gaze position detection method according to claim 14, further comprising the steps of:
   extracting a basis coordinate of the user's face area as the feature point;
   calculating the relative position of the basis coordinate of the user's face area on the image for the dictionary pattern;
   geometrically transforming the image according to the relative position; and
   extracting the face area and at least one of the right and left pupils from the transformed image as one of the dictionary patterns.

16. The gaze position detection method according to claim 15, further comprising the step of:
   managing correspondence between each of the plurality of dictionary patterns and each of a plurality of indexes on the display.

17. The gaze position detection method according to claim 13, further comprising the step of:
   extracting a basis coordinate of the face area as the feature point, the basis coordinate being a point calculated from at least one of the right and left pupils and the two nostrils on the face area.

18. The gaze position detection method according to claim 17, further comprising the steps of:
   calculating the relative position between the basis coordinate of the face area and a center position on the input image; and
   executing Affine-transformation to the input image as a quantity corresponding to the relative position.

19. The gaze position detection method according to claim 18, further comprising the steps of:
   rotating the input image about an angle corresponding to the relative position; and
   parallelly moving the basis coordinate on the rotated image a distance corresponding to the relative position.

20. The gaze position detection method according to claim 19, further comprising the step of:
   extracting the user's face area and right and left pupil areas from the rotated and parallel-moved image as the extracted pattern to compare with the plurality of dictionary patterns.

21. The gaze position detection method according to claim 13, further comprising the step of:
   partially converting image intensities of pixels included in the input image according to the relative position.

22. The gaze position detection method according to claim 16, further comprising the step of:
   positioning a cursor at the index corresponding to the dictionary pattern matched with the extracted pattern as the user's gaze position.

23. The gaze position detection method according to claim 13, an input position of the image of the image input unit is the same as an input position of the plurality of the dictionary patterns of the image input unit.

24. The gaze position detection method according to claim 17, wherein the basis coordinate is a center point between the right and left pupils and the-two nostrils on the face area or a center point between the right and left pupils.

25. A computer-readable memory, comprising:
   instruction means for causing a computer to store a plurality of dictionary patterns representing a user's face image including pupils, each dictionary pattern corresponding to each of a plurality of indexes on a display, an image for each dictionary pattern being previously input at a predetermined camera position while the user is gazing at each index on the display, the image being geometrically transformed as the dictionary pattern according to a relative position of a feature point of the user's face area on the image;
   instruction means for causing a computer to input an image including the user's pupils through an image input unit at the predetermined camera position in the users operation mode;
   instruction means for causing a computer to extract at least one feature point from a face area on the input image;
   instruction means for causing a computer to geometrically transform the input image according to a relative position of the feature point on the input image;
   instruction means for causing a computer to extract a pattern including the user's pupils from the transformed image;
   instruction means for causing a computer to compare the extracted pattern with each of the plurality of dictionary patterns; and
   instruction means for causing a computer to determine the user's gaze position as one index on the display according to the dictionary pattern matched with the extracted pattern.

* * * * *